United States Patent
Kobe et al.

[11] Patent Number: 5,888,335
[45] Date of Patent: Mar. 30, 1999

[54] MULTIPLE RELEASABLE CONTACT RESPONSIVE FASTENERS

[75] Inventors: James J. Kobe, Newport; Maurice E. Freeman, Maplewood; Bradley D. Zinke; Shih-Lai Lu, both of Woodbury, all of Minn.

[73] Assignee: Minnesota Mining and Manufacturing Company, Saint Paul, Minn.

[21] Appl. No.: 769,103

[22] Filed: Dec. 18, 1996

Related U.S. Application Data

[60] Continuation of Ser. No. 454,749, May 31, 1995, abandoned, which is a division of Ser. No. 204,007, Mar. 1, 1994, abandoned, which is a continuation of Ser. No. 35,387, Mar. 22, 1993, abandoned, which is a continuation-in-part of Ser. No. 573,321, Aug. 24, 1990, Pat. No. 5,196,266, which is a continuation-in-part of Ser. No. 427,448, Oct. 26, 1989, abandoned.

[51] Int. Cl.$^6$ .................................................. C09J 5/00
[52] U.S. Cl. ..................... 156/306.3; 24/304; 156/152; 248/205.3; 428/99; 428/343
[58] Field of Search ................ 156/152, 306.3; 428/99, 343; 24/304; 248/205.3

[56] References Cited

U.S. PATENT DOCUMENTS

| | | |
|---|---|---|
| 2,378,695 | 6/1945 | Fryling . |
| 2,395,070 | 2/1946 | Sarbach . |
| 2,535,852 | 12/1950 | Hatfield et al. . |
| 2,648,858 | 8/1953 | Le Bolt . |
| 2,714,562 | 8/1955 | Hechtman . |
| 2,962,404 | 11/1960 | McIntyre et al. . |
| 3,049,228 | 8/1962 | Burnett . |
| 3,196,034 | 7/1965 | Pandolfo . |

(List continued on next page.)

FOREIGN PATENT DOCUMENTS

| | | |
|---|---|---|
| A 74595-87 | 1/1988 | Australia . |
| A 11700-88 | 9/1988 | Australia . |
| A 20442-88 | 4/1989 | Australia . |
| 621180 | 7/1992 | Australia . |
| 2026627 | 4/1991 | Canada . |
| 2019283 | 9/1991 | Canada . |
| 0 121 430 | 10/1984 | European Pat. Off. . |
| 0 187 044 | 7/1986 | European Pat. Off. . |

(List continued on next page.)

OTHER PUBLICATIONS

*Handbook of Adhesives,* Skeist, Third Edition, Van Nostrand Reinhold, New York, 1990, pp. 11–15 and 573–578.
*Encyclopedia of Polymer Science,* vol. 1, John Wiley & Sons, New York, 1985, pp. 511–515.
BF Goodrich Publication, "Materials for Adhesives", Mar. 1981.
Product Informtion, Scotchmate™ Hook and Loop Fasteners, Oct. 1989.
Technical Assoc. of the Pulp and Paper Industry, UM 213; 1991 TAPPI Useful Methods, p. 21.
*Handbook of Pressure–Sensitive Adhesive Technology,* D. Satas eds., (Van Nostrand Reinhold, NY 1982); pp. 206–209, 265–268.
*Handbook of Pressure–Sensitive Adhesive Technology,* D. Satas eds., (Van Nostrand Reinhold, NY 1989; 2nd edition); pp. 206–209, 265–268.
*Polymer Handbook,* J. Brundrup and E. H. Immergut, eds., 2, (Wiley, NY, 1975); IV–337 to IV–341.

Primary Examiner—John J. Gallagher
Attorney, Agent, or Firm—Doreen S. L. Gwin

[57] ABSTRACT

A multi-cycle refastenable contact responsive non-tacky fastener system and method of use with a field of a contact responsive fastening layer having essentially no surface tack. The fastening layer is multiply releasable and refastenable against a non-tacky target surface, and has substantially constant 90° peel strength of less than about 5 kN/m when in contact with the target surface. A mounting layer comprises a field of a pressure sensitive adhesive onto which the field of the contact responsive layer is directly attached.

22 Claims, 1 Drawing Sheet

U.S. PATENT DOCUMENTS

| | | | |
|---|---|---|---|
| 3,239,478 | 3/1966 | Harlan, Jr. . | |
| 3,241,795 | 3/1966 | Frye | 248/205.3 |
| 3,311,339 | 3/1967 | Frye | 248/205.3 |
| 3,574,864 | 4/1971 | Bradley . | |
| 3,635,861 | 1/1972 | Russell . | |
| 3,638,651 | 2/1972 | Torr . | |
| 3,689,346 | 9/1972 | Rowland . | |
| 3,691,140 | 9/1972 | Silver . | |
| 3,745,587 | 7/1973 | Bradley . | |
| 3,849,949 | 11/1974 | Steinhauser et al. . | |
| 3,917,607 | 11/1975 | Crossland et al. . | |
| 3,921,221 | 11/1975 | Zoephel . | |
| 3,932,328 | 1/1976 | Korpman . | |
| 3,932,563 | 1/1976 | Argurio et al. . | |
| 3,937,683 | 2/1976 | Ferrar . | |
| 3,954,692 | 5/1976 | Downey . | |
| 3,985,833 | 10/1976 | Argurio et al. . | |
| 4,018,333 | 4/1977 | Blackwood . | |
| 4,022,850 | 5/1977 | Booth et al. . | |
| 4,024,312 | 5/1977 | Korpman . | |
| 4,040,124 | 8/1977 | Zoephel . | |
| 4,042,732 | 8/1977 | Ferrar . | |
| 4,053,540 | 10/1977 | Argurio et al. . | |
| 4,104,327 | 8/1978 | Inoue et al. . | |
| 4,127,685 | 11/1978 | Busby et al. . | |
| 4,136,699 | 1/1979 | Collins et al. . | |
| 4,189,547 | 2/1980 | Osborn et al. . | |
| 4,212,912 | 7/1980 | Wartusch et al. . | |
| 4,288,567 | 9/1981 | Feeney et al. . | |
| 4,300,562 | 11/1981 | Pieniak . | |
| 4,329,384 | 5/1982 | Vesley et al. . | |
| 4,330,590 | 5/1982 | Vesley . | |
| 4,374,077 | 2/1983 | Kerfeld . | |
| 4,399,249 | 8/1983 | Bildusas . | |
| 4,414,316 | 11/1983 | Conley . | |
| 4,418,123 | 11/1983 | Bunnelle et al. . | |
| 4,420,502 | 12/1983 | Conley . | |
| 4,514,554 | 4/1985 | Hughes et al. . | |
| 4,522,874 | 6/1985 | Pommez . | |
| 4,540,619 | 9/1985 | Watanabe . | |
| 4,558,542 | 12/1985 | Marton . | |
| 4,576,850 | 3/1986 | Martens . | |
| 4,576,854 | 3/1986 | Kurahashi . | |
| 4,584,225 | 4/1986 | Adelman . | |
| 4,643,730 | 2/1987 | Chen et al. . | |
| 4,652,491 | 3/1987 | Gobran . | |
| 4,684,685 | 8/1987 | Shuman et al. . | |
| 4,710,190 | 12/1987 | Wood et al. . | |
| 4,717,749 | 1/1988 | Tang et al. . | |
| 4,728,572 | 3/1988 | Davis . | |
| 4,756,498 | 7/1988 | Frye | 248/205.3 |
| 4,759,754 | 7/1988 | Korpman . | |
| 4,761,341 | 8/1988 | Rosiak et al. . | |
| 4,778,701 | 10/1988 | Pape et al. . | |
| 4,780,367 | 10/1988 | Lau et al. . | |
| 4,785,043 | 11/1988 | Kawai et al. . | |
| 4,787,897 | 11/1988 | Torimae et al. . | |
| 4,791,024 | 12/1988 | Clerici et al. . | |
| 4,810,574 | 3/1989 | Ahner . | |
| 4,813,947 | 3/1989 | Korpman . | |
| 4,820,589 | 4/1989 | Dobreski et al. . | |
| 4,833,193 | 5/1989 | Sieverding . | |
| 4,861,635 | 8/1989 | Carpenter et al. . | |
| 4,875,259 | 10/1989 | Appeldorn . | |
| 4,887,339 | 12/1989 | Bellanger . | |
| 4,906,691 | 3/1990 | Joseph et al. . | |
| 4,942,071 | 7/1990 | Frye | 248/205.3 |
| 4,956,228 | 9/1990 | Clerici et al. . | |
| 4,959,265 | 9/1990 | Wood et al. . | |
| 4,974,384 | 12/1990 | Pacione . | |
| 4,977,003 | 12/1990 | Brown et al. . | |
| 4,979,613 | 12/1990 | McLaughlin et al. . | |
| 5,006,398 | 4/1991 | Banerji . | |
| 5,007,229 | 4/1991 | Wedel et al. | 53/461 |
| 5,019,071 | 5/1991 | Bany et al. . | |
| 5,019,072 | 5/1991 | Polski . | |
| 5,028,646 | 7/1991 | Miller et al. . | |
| 5,042,221 | 8/1991 | Pacione . | |
| 5,047,102 | 9/1991 | Emery | 156/306.3 |
| 5,049,423 | 9/1991 | German, Jr. . | |
| 5,060,443 | 10/1991 | Pacione . | |
| 5,066,526 | 11/1991 | German, Jr. . | |
| 5,085,655 | 2/1992 | Mann et al. . | |
| 5,088,164 | 2/1992 | Wilson et al. . | |
| 5,112,674 | 5/1992 | German et al. . | |
| 5,112,889 | 5/1992 | Miller et al. . | |
| 5,113,555 | 5/1992 | Wilson et al. . | |
| 5,114,763 | 5/1992 | Brant et al. . | |
| 5,133,166 | 7/1992 | Pacione . | |
| 5,141,809 | 8/1992 | Arvedson et al. . | |
| 5,141,981 | 8/1992 | George et al. . | |
| 5,144,786 | 9/1992 | Pacione . | |
| 5,145,929 | 9/1992 | Ou-Yang . | |
| 5,147,708 | 9/1992 | Brant et al. . | |
| 5,154,981 | 10/1992 | Brant et al. . | |
| 5,158,557 | 10/1992 | Noreen et al. . | |
| 5,160,770 | 11/1992 | Hoopengardner . | |
| 5,173,343 | 12/1992 | Arvedson et al. . | |
| 5,175,030 | 12/1992 | Lu et al. . | |
| 5,183,597 | 2/1993 | Lu . | |
| 5,196,266 | 3/1993 | Lu et al. . | |
| 5,208,096 | 5/1993 | Dohrer . | |
| 5,354,597 | 10/1994 | Capik et al. . | |
| 5,462,782 | 10/1995 | Su | 248/205.3 |

FOREIGN PATENT DOCUMENTS

| | | |
|---|---|---|
| 0 260 873 | 3/1988 | European Pat. Off. . |
| 90.301104 | 8/1990 | European Pat. Off. . |
| 90311600 | 8/1991 | European Pat. Off. . |
| 90313881 | 8/1991 | European Pat. Off. . |
| 1 918 626 | 10/1969 | Germany . |
| 56-26968 | 3/1981 | Japan . |
| 59-32634 | 2/1984 | Japan . |
| 61-60711 | 4/1986 | Japan . |
| 62-66825 | 3/1987 | Japan . |
| 62 112 507 | 5/1987 | Japan . |
| 189485 | of 1988 | Japan . |
| 60-37045 | 4/1989 | Japan . |
| A-110584 | 4/1989 | Japan . |
| 118604 | 5/1989 | Japan . |
| 138280 | 5/1989 | Japan . |
| 1-50351 | 10/1989 | Japan . |
| Hei 2-16944 | 4/1990 | Japan . |
| 6-136186 | 5/1994 | Japan . |
| NI-46367 | 8/1991 | Taiwan . |
| NI 73088 | 8/1992 | Taiwan . |
| 1 215 796 | 12/1970 | United Kingdom . |
| 2 057 916 | 4/1981 | United Kingdom . |
| 2 058 610 | 4/1981 | United Kingdom . |
| 2 116 253 | 9/1983 | United Kingdom . |
| 2 166 427 | 5/1986 | United Kingdom . |
| PCT-EP88-00176 | 9/1989 | WIPO . |
| WO 92/11332 | 7/1992 | WIPO . |
| WO 92/11333 | 7/1992 | WIPO . |
| WO 92/22619 | 12/1992 | WIPO . |
| WO 94/21742 | 9/1994 | WIPO . |
| WP 95/10576 | 4/1995 | WIPO . |

MULTIPLE RELEASABLE CONTACT RESPONSIVE FASTENERS

This is a continuation of application Ser. No. 08/454,749, filed May 31, 1995, now abandoned, which, in turn, is a divisional of Ser. No. 08/204,007, filed on Mar. 1, 1994, now abandoned, which, in turn, is a continuation of Ser. No. 08/035,387, filed on Mar. 22, 1993 (abandoned), which, in turn, is a continuation-in-part of Ser. No. 07/573,321, filed Aug. 24, 1990, now U.S. Pat. No. 5,196,266, which, in turn, is a continuation-in-part of Ser. No. 07/427,448, filed Oct. 26, 1989 (abandoned).

FIELD OF THE INVENTION

This invention relates to non-tacky contact responsive fastener systems, methods of use, and non-tacky fastening compositions. The fastener systems can be repeatedly closed and opened.

BACKGROUND OF THE INVENTION

Quick close/quick release mechanical fasteners are known. They may be repeatedly closed and opened and are frequently referred to as being reclosable. One such fastener, known as a hook and loop fastener, is available from Velcro U.S.A., Inc., Manchester, N.H. Another such fastener, known as a mushroom-shaped fastener, is sold as the Dual Lock® Reclosable Fastener by the Minnesota Mining and Manufacturing Company, St. Paul, Minn. Although both of these fasteners are widely used and have been shown to be extremely useful, they have certain undesirable characteristics. For example, the hook or mushroom portions of the fasteners tend to snag fabric. Moreover, both the hook and loop portions of the fasteners tend to collect lint and dust. Also, these types of fasteners do not exhibit a thin profile, which may detract from an aesthetic appearance. Another feature of the hook and loop fastener is that it makes noise when it is opened. This makes it undesirable in any application where noise is a concern, such as for military use.

Other known fastening systems, such as double sided tape also have various limitations. These limitations include non-recyclability, inability to obtain perfect alignment of opposing fastening components, extensive process steps required to manufacture compositions comprising the fasteners, difficulty of attaching or mounting the fasteners to certain substrates, incompatibility with high speed application equipment, undesired transfer of the adhesive to a contact surface, and incompatibility with manual attachment of the adhesive product to an article.

SUMMARY OF THE INVENTION

The invention involves a multi-cycle refastenable contact responsive non-tacky fastener system. The fastening component of the system comprises a contact responsive fastening layer which has a surface that possesses essentially no surface tack, is multiply releasable and refastenable against a non-tacky target surface. The fastening component has substantially constant 90° peel strength when in contact with the target surface at room temperature (i.e., 22° C.) when tested as described below. Preferably, the 90° peel strength is less than 5 kilonewton per meter (kN/m). More preferably the 90° peel strength is in the range of from about 0.01 (kN/m) to about 3 kN/m. The target surface may be a different material than the fastening layer and preferably has a solubility parameter that is sufficiently different from that of the fastening layer to prevent blocking of the target surface to the fastening layer.

A preferred contact responsive fastener system reaches its optimum and maximum peel strength relatively quickly so that a dwell time is either essentially unnecessary, or is relatively unnoticeable to a user of the fastener. It is also desirable that the fastening layer maintains a substantially constant 90° peel strength over a long time period and does not exhibit any significant build-up of 90° peel strength over time.

The target surfaces useful in the invention may generally be considered to be smooth. As such, they may have some surface texture. Preferably, however, the target surface is essentially smooth. The fastening component also comprises a mounting layer comprising a pressure sensitive adhesive on the contact responsive fastening layer.

The invention further involves a method of using a non-tacky contact responsive fastener system by providing a contact responsive fastening layer which has essentially no surface tack; attaching the contact responsive fastening layer to a mounting layer comprising a pressure sensitive adhesive; and attaching the mounting layer to a substrate in position for the fastening layer to be in alignment with the target surface.

The invention also involves a contact responsive fastener system for permitting multiple repositioning of a non-tacky portion of a covering on a structure. This embodiment of the fastener comprises a connecting means to attach the fastener to a structure that is to be protected by a covering, a fastening layer functionally connected to the connecting means, the fastening layer having a composition demonstrating properties of essentially no surface tack and low 90° peel strength, and a covering having a non-tacky surface portion suitable for multiple fastening and releasing from the fastening layer.

The invention also involves a method for permitting multiple repositioning of a covering on a structure. The method comprises the steps of providing connecting means for attachment to a structure that is to be protected by a covering; attaching a fastening layer to the connecting means, the fastening layer having a composition demonstrating properties of essentially no surface tack and low 90° peel strength so that a non-tacky surface of a covering may be attached to and repeatedly repositioned on the fastening layer; connecting the connecting means to the structure to be covered; and contacting the fastening layer with a portion of a covering so that the covering is in repositionable attachment to the fastening layer. If desired, the location of the connecting means and the fastening layer may be reversed.

The invention still further involves a recyclable, multiple reclosable enclosure. The enclosure comprises (a) a fastening component that has a fastening layer which has properties of essentially no surface tack, multiple repositionability against a non-tacky target surface, and a constant 90° peel strength when in contact with the target surface; and (b) a recyclable attaching means for attaching the fastening layer to a first surface of the enclosure. Preferably the fastening layer is recyclable when used with plastic enclosures or repulpable when used with paper enclosures. When not recyclable or repulpable, the fastening layer is preferably readily removable, such as by screening, during recycling or repulping.

DETAILED DESCRIPTION OF THE INVENTION

The invention relates to a new class of fastener structures that has at least one contact responsive fastening layer which has essentially no surface tack to paper. The contact responsive fastening layer allows multiple fastening and releasing cycles of the fastening layer with a target surface. The target surface may comprise either another essentially tack free surface or it may simply be a non-tacky smooth surface. The target surface preferably has a solubility parameter or other characteristic (such as surface roughness) which permits maximum contact area with the fastening layer and which allows the fastening layer to have a selectable and consistently repeatable low 90° peel strength and a high shear strength. Preferably, the fastening layer may be cycled against the target surface numerous times without any noticeable transfer or migration of any part of either the fastening layer to the target surface or the target surface to the fastening layer.

Numerous polymeric materials may be used as the contact responsive layer. The polymeric material may be a homopolymer, a random copolymer, a block copolymer, a graft copolymer. It may be crosslinked or uncrosslinked. Specific examples of polymers useful as the fastening layer include ethylene-containing copolymers, urethane polymers such as urethanes prepared by the reaction of an isocyanate and an isocyanate-reactive compound, acrylic and acrylate polymers, urethane-acrylate polymers, butyl rubber, butadiene-acrylonitrile polymers and butadiene-acrylonitrile-isoprene polymers. Blends and mixtures of polymeric materials may be used if desired.

Various other materials may be incorporated into the polymeric material. For example, tackifiers may be used if desired. Additionally, fillers, pigment, plasticizers, antioxidants, ultraviolet light stabilizers, and so forth may be employed. The exact quantity of these other materials may be varied to suit the desires of the compounder, provided that the resulting contact responsive layer retains its essentially tack-free character. Thus, the ratio of the various other materials (i.e., tackifier, filler, and/or pigment) may be varied as needed to maintain the tack-free nature of the contact responsive layer.

Additional discussion regarding polymers and compositions useful as the fastening layer may be found in a number of publications. For example, European Patent Pub. No. EP 0443263 (Miller et al.) discloses tackified block copolymer materials; U.S. Pat. No. 5,196,266 (Lu et al.) discloses urethane-acrylate materials; and U.S. Pat. Nos. 5,114,763, 5,141,809, 5,141,981 and 5,147,708, each disclose polyethylene-containing polymers with tackifiers, ethylene-vinyl acetate and acrylates. These patents are incorporated herein by reference with respect to the polymers and compositions.

Preferred polymers for use as the contact responsive layer are selected from the group consisting of butadiene-acrylonitrile (hereinafter BACN) polymers, butadiene-acrylonitrile-isoprene (hereinafter BACNI) polymers, urethane acrylate (hereinafter UA) polymers, butyl rubber polymers, two-part urethane (hereinafter UR) polymers, styrene-isoprene-styrene (hereinafter SIS) block copolymers and styrene-butadiene-styrene (hereinafter SBS) polymers.

The BACN and BACNI polymers typically have from 10 to 50% by weight acrylonitrile units. Additionally, the BACNI polymer typically contains from 2 to 20% by weight isoprene units. Either of these types of polymer may be processed by solvent coating or hot melt extrusion. Hot melt extrusion is preferred because it obviates the necessity to use solvents during processing; it provides an ability to coat the fastening layer directly onto cloth or porous backings; it is a low cost process and uses low cost materials; and it is not necessary to add a crosslinker to further crosslink the composition, since hot melt extrusion of butadiene-containing materials is known to cause some chemical crosslinking. The result is an essentially tack free hot melt coated contact responsive fastening layer with all of the above features as well as most of the desirable features of hook and loop fastening systems.

The UA polymer is primarily designed for adhesion to itself but it also works very well with a variety of target surfaces. This polymer comprises (i) a one-part, preferably solvent-free, radiation-curable, addition-polymerizable, crosslinkable, organic oligomeric resin having one or more like or different hard segments, one or more like or different soft segments, and one or more like or different monovalent moieties containing a radiation-sensitive, addition-polymerizable, functional group, and (ii) a photoinitiator.

The butyl rubber polymers are preferably combined with a de-tackifying agent, such as talc, to decrease the tack of these compositions depending upon the target surface.

While the precise nature of the contact responsive layer may be varied to suit the particular application, it should be noted that the preferred layer does not block, i.e., form a permanent bond to itself or to a smooth target surface. Preferably, the contact responsive fastening layer 12 demonstrates 90° peel strength values to a target surface of about 0.01 kN/m to about 3 kN/m, and more preferably within a range of about 0.01 kN/m to about 1.5 kN/m, and even more preferably within a range of about 0.01 kN/m to about 0.5 kN/m. An even more preferable range of peel values for fastening layer 12 is from about 0.01 kN/m to about 0.4 kN/m, and a most preferable range is within about 0.01 kN/m to about 0.2 kN/m. These 90° peel strength values are measured according to the technique described hereinafter.

In some cases, it may be necessary to adjust the coating weight/coating thickness to achieve the desired 90° peel value. Furthermore, the polymer may be additionally crosslinked in order to further increase its internal strength and reduce 90° peel values to a desired level. This is an especially useful technique to use when the contact responsive layer and the target surface comprises BACN, BACNI, or a combination of each. In this instance, the BACN and/or BACNI polymer is preferably modified by crosslinking in order to prevent blocking of the contact responsive layer to the target surface. Crosslinking is one method for increasing the internal strength of the BACN so that the fastening layer maintains a relatively constant peel strength over repeated uses. Additionally, crosslinking provides a means for controlling the peel strength of the material against another material.

The 90° peel strength of the fastener system of the invention can also be controlled by appropriate selection of the target surface to which it is to be fastened. It has been discovered that for some fastener systems, particularly a BACN system, as the difference between solubility parameter of the fastening layer and that of the target surface increases, the peel strength (i.e., as exemplified by 180° peel strength) decreases.

Target surfaces useful in the invention may be selected from a wide variety of materials. Useful target surfaces are materials that do not bond permanently to the fastening layer. Examples of useful target surfaces include those materials previously identified as being useful for the fastening layer, polycarbonate, polyacrylonitrile, butadiene-styrene polymers, poly(methylmethacrylate), polyamide, ethylene vinylacetate copolymer, treated and untreated poly (ethylene terephthalate), Surlyn™, polystyrene, acrylonitrile butadiene-styrene polymer, polypropylene, and polystyrene. Useful target surfaces also include metallic surfaces such as stainless steel; glass; paper; enamel coated substrates; etc. The exact choice of target surface to be used is dependent upon the needs of the user, provided however, that the target surface and fastening layer do not block.

It has also been discovered that the peel strength can be influenced by the nature of any mounting layer that may be used. For example, higher peel values are typically obtained when a stiff (i.e., rigid) mounting layer is utilized.

An advantageous feature of the fastening layer is that it is cleanable, for example, with isopropanol or soap and water, in order to maintain/restore its fastening characteristics. This is a valuable consideration in view of the tendency of these compositions to eventually lose fastening capability when contacted with certain contaminants, such as oils. However, the rejuvenation of these fastener structures results in a long useful life of products using these structures. In addition, it is possible to identify fastening surfaces which are more likely to be contaminated by contact and to use the disclosed non-tacky compositions as the opposing target surface. For example, a diaper closure tab could have a biaxially oriented polypropylene target surface and correspondingly the diaper fastening area could have a non-tacky polymer surface, i.e., the fastening layer. Another useful example is a reusable envelope in which the flap has a target surface material (either as part of the envelope or adhered to the envelope) and the envelope body has a polymer layer selected from the disclosed fastening layer compositions. In each of these examples, the placement of the fastening layer is designed to reduce the contamination of the fastener structure.

A number of specific embodiments of the invention are illustrated in the Figures. For Example, FIG. 1 discloses contact responsive fastener structure 10 comprising fastening layer 12 having a first surface 14 attached to a mounting layer 17. Mounting layer 17 preferably comprises a tacky pressure sensitive adhesive. Mounting layer 17 permits permanent mounting of fastener structure 10 to another substrate in a position which enables multiple releasable contact between fastening layer 12 and a target surface. When the composition of fastening layer 12 is a urethane-acrylate polymer, it may be coated directly onto mounting layer 17 and cured with ultraviolet radiation. Alternately, when the composition of fastening layer 12 is a butadiene-acrylonitrile polymer or a butadiene-acrylonitrile-isoprene polymer, it may be hot melt or solvent coated onto mounting layer 17. In either embodiment, as with other suitable compositions, a novel fastener structure 10 results.

Figures 1, 2, 3, 4, 5:
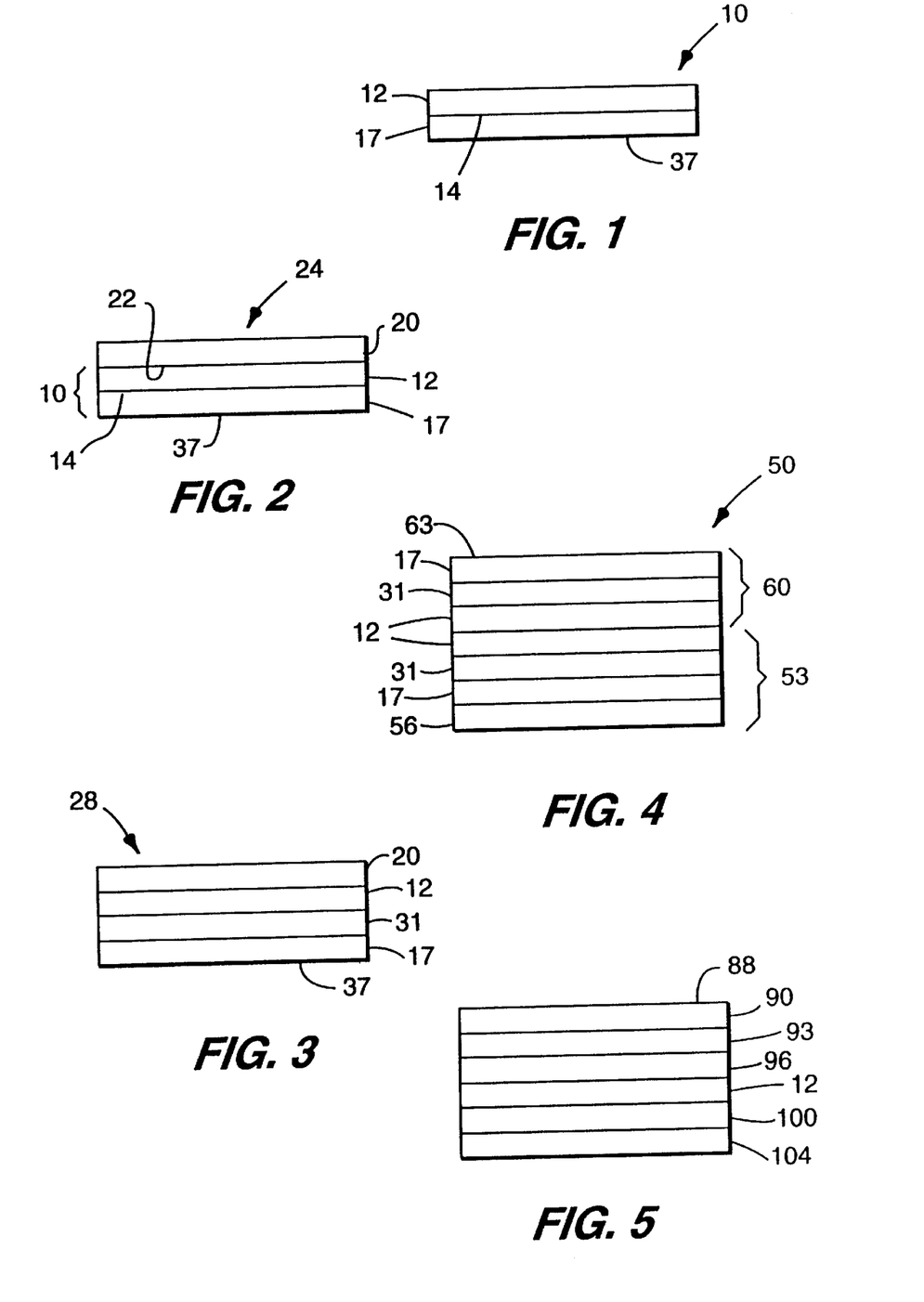
FIG. 1 is a side view of a fastener system fastening component.
FIG. 2 is a side view of a fastener system fastening component with a removable cover layer.
FIG. 3 is a side view of a fastener system fastening component with an interposing backing layer.
FIG. 4 is a side view of a fastener system fastening component shown in multiple releasable aligned contacting relation with another fastening component (i.e., a premated construction).
FIG. 5 is a side view of a fastener system embodiment used with an abrasive disk and backup pad.

FIG. 2 discloses a fastener structure having an additional layer of material. In this embodiment, a covering layer 20, such as a removable liner, is attached to a second surface 22 of the fastening layer 12 to produce a dispensable fastening tape 24. Fastening tape 24 is particularly useful as a tape which may be dispensed from an adhesive transfer gun or similar tape dispenser. In this embodiment, covering layer 20 is attached to fastening layer 12 sufficiently to prevent unintentional removal during tape dispensing and positioning on a substrate or structure. After tape 24 is properly positioned, and mounting layer 17 is firmly attached to the underlying substrate, the covering layer may be removed to allow placement of a target surface against fastening layer 12. This sequence permits ease of placement of tape 24 without contaminating fastening layer 12.

FIG. 3 discloses a tape 28. Tape 28 is similar in use and structure to tape 24, but has an additional backing layer 31. Backing layer 31 may comprise a scrim, a woven material, a non-woven material, paper, metal foil, or a polymeric material, such as a film. Other materials may also be used as backing layer 31 provided there is the desired level of adhesion to and material compatibility with both fastening layer 12 and mounting layer 17. Specific types of materials that are useful as the backing material 31 include polycarbonate, poly(methylmethacrylate), polypropylene, polyethylene, polystyrene, acrylonitrile-butadiene styrene polymer, and polyester. Other useful materials for backing layer 31 include oriented poly(ethylene terephthalate) film with or without a corona treated surface, cellulose acetate butyrate, cellulose acetate propionate, poly(ether sulfone), polyurethane, poly(vinyl chloride), paper, fabric and metal. The most preferred backing material is a biaxially oriented polypropylene film which has been corona treated in the presence of chlorinated hydrocarbon or a chlorofluorocarbon gas. Such materials are described in U.S. Pat. Nos. 4,844,979 and 4,828,871.

Backing layer 31 should be of a thickness to provide sufficient support to fastening layer 12. Backing layer 31 is preferably at least 0.0125 mm thick, in order to provide both good strength and good handling properties to the fastener structure. It is preferred that the substrate comprising backing layer 31 have a tensile strength of at least about 1500 Mega Pascals (MPa). In many applications it is also preferred that the backing layer be flexible, i.e., capable of being bent to a radius of 0.5 cm without breaking.

If the embodiment of FIG. 3 is used as a sewn-on fastener structure it is possible to omit mounting layer 17. In FIGS. 1–3, an optional removable liner, may be attached to an exposed second surface 37 of mounting layer 17. Use of these fastener structures with appropriate liners permit bulk roll storage and dispensing and provide ease of application for users of the fastener structures.

FIG. 4 discloses another embodiment of the invention. This embodiment is useful for multiple fastening and releasing of a first article to a second article. This fastener system 50 comprises a first tape 53 having fastening layer 12, optional backing layer 31, mounting layer 17, and optional removable liner 56. Second tape 60 comprises fastening layer 12, optional backing layer 31, and mounting layer 17. A second optional removable liner may be applied to the structure at second tape surface 63. Alternatively, either of the two fastening layers (but not both) may be replaced with a target surface having a non-tacky characteristic and which is chosen to yield appropriate peel and shear strengths when in contact with a fastening layer surface. Fastener system 50 is quite useful in providing substantially perfect alignment and fastening of two unattached/non-aligned articles. System 50 is also useful as a reinforced fastener system for structural coverings. For example, a flexible window protective film may be attached to the mounting layer 17 of the second tape 60 at first surface 63. This structure may receive further reinforcement from optional backing layer 31 and/or fastening layer 12.

Further, the invention involves an abrasive grinding disk. The disk comprises an abrasive layer and a fastening layer functionally connected to the abrasive layer. The fastening layer has properties of essentially no surface tack, low 90° peel strength, and high shear strength so that the abrasive grinding disk is rapidly attachable to a non-tacky surface of a backup pad and does not leave a discernable residue on the backup pad. An alternative embodiment of the disk comprises connecting a non-tacky target layer with the abrasive layer and configuring the backup pad with a surface consisting of a non-tacky fastening layer.

FIG. 5 discloses one embodiment of an abrasive grinding disk. The disk has an abrasive surface 88, paper backing 90, tacky pressure sensitive adhesive 93, backing 96, non-tacky fastening layer 12, and a backup pad 104 having a target surface 100 opposing the fastening layer. The fastening layer 12 can also be direct coated onto the back of the sandpaper backing. Alternatively, the location of the non-tacky fastening layer and the target surface may be reversed if desired.

The contact responsive fastener system of the invention may be provided as a preniated structure or, alternatively, in the form of separate components. In its various embodiments, it is useful for permitting multiple fastening and releasing of a covering onto a structure, or for multiple fastening and releasing of a first article to a second article. Examples of such uses include floor coverings (such as carpeting), wall coverings, placement of information on display stands, signage and changeable indicia mounting zones, electronic display screen protective coverings, toy surfaces, table tops, album pages, and internal content control means for use with packaging/shipping materials, placement of printing sheets on a flexographic drum, roller, or a flat printing plate.

Non-tacky fasteners have particularly useful properties for carpet installation because they are low cost, have a thin profile, have very high shear strength, do not employ solvents, and are easy to install. Current methods of carpet installation include use of double coated tapes, tack strips, contact adhesives and hook and loop fasteners. All but the hook and loop require professional carpet installers. For these applications, moderate peel strength in combination with high shear strength is required to prevent lifting at the edges of the carpets, while at the same time preventing the carpet from moving sideways. The contact responsive non-tacky fasteners are quick and easy to apply. Since they are multiply repositionable, replacement of carpet sections and design changes are easy and of low cost.

The fastening system may be used to secure the carpet to a floor or other surface in a number of ways. For example, the fastening layer may be secured to the back of the carpet with the target being secured to the floor or other surface. Alternatively, the target may be secured to the carpet with the fastening layer being secured to the floor or other surface. Moreover, the fastening layer and target surfaces may be secured to the carpet, floor or other surface by a number of methods. For example, adhesives (e.g., pressure sensitive, water-based, organic-solvent based, hot-melt coated, two-part, heat activated, solvent activated) may be used. Alternatively, they may be coated directly onto the carpet backing, floor or other surface. Furthermore, they may be mechanically secured to the backing, etc., such as by sewing. In some cases, a separate target surface may be unnecessary. Thus, for example, the carpet backing, floor or other surface may inherently serve as a suitable target surface.

Other uses include fastenings on disposable consumer goods requiring multiple closures, and clean room or medical and surgical garment fastenings. For example, they may be used with surgical gowns, drapes, and surgical gloves. A non-tacky fastener of the invention may be used to form a fluid resistant seal with a surgical glove. Drape uses include tube and cord organizers, repositional plastic pouches, repositional incisor areas, and attachments of repositional drape parts. The advantages of the invention include low cost, non-tacky properties, thin profiles, compatibility with latex gloves, and adjustable peel strength. The fasteners can be made adjustable to allow for good fit and essentially complete seals at the junction of gloves and gowns to prevent contamination with bodily fluids. Non-tacky fasteners will not entangle the non-woven hair coverings worn by surgeons and nurses.

Other uses for the fastener of the invention include attachment of abrasive disks to grinders/sanders. The non-tacky fasteners of the invention can operate at sufficiently high temperatures to function in the attachment of coated abrasives to a support means or backup pad for mechanical or hand grinding. They also provide sufficient peel strength and shear strength to be used as an attachment means for coated abrasives. These fasteners provide advantages over the existing mechanical, tacky pressure sensitive adhesives, and hook and loop fasteners used with coated abrasives.

As with the widely used tacky pressure sensitive adhesives, the non-tacky polymer fastener allows rapid replacement of abrasive sheets or disks. Moreover, non-tacky fastening systems of the invention demonstrate the ability to withstand high grinding temperatures without either flowing out and contaminating the work piece or strongly adhering the coated abrasive to the support means. Though the fasteners of the invention can be contaminated by grinding debris, they can be rejuvenated with washing with an alcohol and/or with soap and water, and can be used multiple times. Additionally, with added care to reduce exposure of the fastening layer to debris, they can be used multiple times before washing if necessary.

The fastener of the invention can also be used as a closure for envelopes, particularly recyclable envelopes, mailers and pouches. For example, the non-tacky fastening system can be used to construct recyclable, reclosable envelope fasteners. The fastener may be attached to the envelope using either a water dispersible adhesive or another repulpable adhesive system.

This fastening system offers advantages over current reclosable envelope closure systems, i.e. string and button, clasp, and interoffice multiple use pressure sensitive adhesive enclosures. The advantages are lower cost, compatibility with high speed application equipment, non-tacky properties (i.e. will not stick to paper), capability to be coated on a printed paper backing, thin profile, and ability to recycle. The non-tacky fastener will not adhere to paper or fingers, yet has peel, shear, and tensile performance properties similar to known pressure sensitive adhesive closure systems.

There is also a need for reclosable interoffice envelopes. No current multiply reclosable envelope closure system is considered to be recyclable. A non-tacky fastening layer of the invention coated onto repulpable paper with a water dispersible adhesive passes repulpability tests (Technical Association of the Pulp and Paper Industry UM213). The non-tacky fastening layer may be water insoluble, but it is removable by a screening process.

The fastener of the invention may also be used to secure window or window frame protective coverings to a surface. For example, the non-tacky surface of a fastener as shown in FIG. 1 may applied to a window frame using a pressure sensitive adhesive as layer 17 in contact with the window frame. The non-tacky fastener surface of layer 12 may be left exposed, and a window film applied directly to the smooth non-tacky surface of layer 12. The window film may then be shrunk to fit tightly across the window. The film may be removed and reattached several times.

Alternatively, window films use double coated tacky tape attachment methods. With this attachment the films are primarily intended for a one time use. Use of an attachment system based on non-tacky fastener allows for simple multiple use of the window film. The non-tacky fastener tape can be attached to the window film and window frame in a number of configurations.

Preferably the non-tacky tape would be supplied in a form with 2 non-tacky portions of double coated tape pre-mated as shown in FIG. 4. The pre-mated portion of non-tacky tape would be unrolled to expose a first tacky adhesive on one side and a second tacky adhesive covered with a release liner on the other side. The first tacky adhesive may then be applied to the window frame. The release liner may then be removed from the second tacky adhesive and the window film placed onto the now exposed second tacky adhesive. The window film may then be shrunk to fit tightly across the window.

The film can be removed by separating the non-tacky portion of the pre-mated fastening strips. One strip will be left on the window frame and one will be left on the window film. The film can be reattached by simply realigning the fasteners. The film is then reshrunk as initially. The fastener provides good air seal needed for energy conservation. The invention allows for further resource conservation and for a decrease in waste due to its reusability. Also, a reusable film decreases the long term overall cost which makes the product more cost effective and, therefore, more generally useful. The reclosable feature allows for opening of the window without destruction of the film.

Further embodiments of the invention are found in the following examples. The following tests were used to measure the various test results reported in the examples.

T-Peel Strength

This test was used to determine the peel force required to cause two fastening components to release from each other when the substrate of a composite fastening component was a flexible film having a length of at least 20 cm and when pulling the edges of the fastener in opposite directions away from and perpendicular to the interface of the fastener bond. After two the composite fastening components were placed in contact, the two components were engaged by means of a 2-kg hard-rubber roller, one pass in each direction. After the engaged components were allowed to stand at ordinary room temperature (i.e., 22° C.) for the specified time period (hereinafter dwell time), one end of each component was secured to a jaw of an Instron tensile tester, and the jaws were moved apart at a rate of 30 cm/min.

180° Peel Strength

This test was run according to ASTM D-1000 except that the fastener component was applied to various surfaces using a 2-kg hard rubber roller, one pass in each direction and testing was carried out after about 10 minutes dwell at ordinary room temperature. The peel rate was 30 cm/min.

90° Peel Strength

This was run according to PSTC-5 using various rigid substrates to which the fastener component was applied using a 2-kg hard-rubber roller, one pass in each direction. Samples were allowed to dwell for the specified time and temperature before being separated at a rate of 30 cm/min.

Dynamic Shear Strength

Unless otherwise noted, this test was used to determine the amount of shear force required to either cause two fastening layer components to release from each other or a fastening layer and a target surface to release from each other. A pair of 2.5 cm×10 cm strips was secured together with a 6.25 square centimeter overlap. The strips were engaged by means of a 2-kg hard-rubber roller, one pass in each direction. After the engaged strips were allowed to stand at ordinary room temperature for at least 30 seconds, one end of each strip was secured to a jaw of an Instron tensile tester, and the jaws were separated at a rate of 30 cm/min.

In the examples, all parts are parts by weight, unless otherwise indicated:

The following abbreviations are used throughout the examples.

ABS Acrylonitrile-butadiene-styrene polymer
BACN Butadiene-acrylonitrile polymer
BACNI Butadiene-acrylonitrile-isoprene polymer
BOPP Biaxially oriented polypropylene film
UA Urethane acrylate polymer
SBS Styrene-butadiene-styrene block copolymer
SIS Styrene-isoprene-styrene block copolymer
CA Cellulose Acetate
EVA Ethylene vinylacetate polymer
HDPE High density polyethylene
LDPE Low density polyethylene
MEK Methyl ethylketone
PA Polyamide
PC Polycarbonate
PE Polyethylene
PET Poly(ethylene terephthalate)
PMMA Poly(methyl methacrylate)
PP Polypropylene
PS Polystyrene
PVC Poly(vinyl chloride)
SS Stainless steel The following abbreviations represent the commercially available materials used in the examples:

BACN-1 Nipol™ DN-207, 33% acrylonitrile, Mooney viscosity of 43.
BACN-2 Nipol™ DN-004, 45% acrylonitrile, Mooney viscosity of 43.
BACN-3 Nipol™ DN-214, 33% acrylonitrile, Mooney viscosity of 80.
BACN-4 Nipol™ DN-401L, 19% acrylonitrile, Mooney viscosity of 65.
BACN-5 Goodyear N-206, 45% acrylonitrile, Mooney viscosity of 60.
BACN-6 HYCAR™ 1022, 33% acrylonitrile, Mooney viscosity of 50.
BACNI-1' Nipol™ DN-1201L, 60% butadiene, 33% acrylonitrile, 7% isoprene, Mooney viscosity of 46 (chunk form).
BACNI-2 Nipol™ DN-1201L (with talc), 60% butadiene, 33% acrylonitrile, 7% isoprene, Mooney viscosity of 46 (crumb form with 3–7% magnesium silicate).
SBS. Kraton™ 1101
SIS Kraton™ 1107

The Nipol™ materials available from Zeon Chemicals, Inc. (contains <1% antioxidant).

The Goodyear materials available from Goodyear Chemical Co. (contains <1% antioxidant).

The HYCAR™ materials available from B.F. Goodrich Chemicals (contains <1% antioxidant).

The Kraton™ materials available from Shell Chemical Company.

EXAMPLE 1

Samples of BACN and BACNI-1 which contained an additional 1.5% by weight Ethanox™ 330 antioxidant (Ethyl Corporation) were dissolved in MEK solvent and then coated out onto a 0.05 mm primed polyester film backing to give a dry thickness of 0.83 mm. The samples varied in the proportion of acrylonitrile to butadiene and in Mooney viscosity. The Mooney viscosity reflects composition and molecular weight, i.e. extent of polymerization. Some of these samples contained 0.15% 2-(4-methoxyphenyl)-4,6-bis (trichloromethyl)-1,3,5-triazine crosslinking agent. Some of the samples with the crosslinking agent were exposed to a high intensity medium pressure mercury arc light (Sylvania H33C0-400 boosted with a variable power source) at 600+ watts. The dose was 150–200 millijoules/sq. cm.

T-peel and dynamic shear tests were performed on fastening layer to fastening layer samples. The first set of samples contained 33–34% acrylonitrile in the copolymer used as the fastening layer. It can be seen in Table 1 that all of the uncrosslinked samples blocked (irreversibly bonded) within one hour of contact.

TABLE 2

|  | Cross-linked | T-peel Strength (kN/m) | | | | Dynamic Shear Strength* ($kN/m^2$) |
| --- | --- | --- | --- | --- | --- | --- |
|  |  | 1 min | 2 min | 3 min | 22 hr |  |
| BACN-2 | No | 0.46 | 0.57 | 0.61 | Blocked | 286 |
|  | Yes | 0.56 | 0.67 | 0.64 | 1.75 | 379 |
| BACN-4 | No | 0.31 | 0.50 | 0.50 | 1.44 | 214 |
|  | Yes | 0.31 | 0.39 | 0.41 | 0.67 | 224 |
| BACN-5 | No | 0.18 | 0.25 | 0.29 | Blocked | 265 |
|  | Yes | 0.30 | 0.36 | 0.37 | 1.23 | 259 |
| SBS | No | 0.04 | 0.12 | 0.16 | 1.31 | 234 |
|  | Yes | 0.00 | 0.02 | 0.02 | 1.93 | 252 |
| SIS | No | 0.05 | 0.07 | 0.07 | 0.65 | 225 |
|  | Yes | 0.04 | 0.05 | 0.06 | 0.65 | 241 |

*Shear is measured after 1 minute of dwell time.

Crosslinking did not appear to decrease T-peel strength in the SBS and SIS samples after 22 hours of surface contact. Blocking was not observed in the SBS and SIS samples after 22 hours.

EXAMPLE 2

In these samples, an electron beam was used to crosslink the non-tacky fastening layer. The example used uncrosslinked BACNI-2 and an additional 1.5% Ethanox™ 330 antioxidant in each sample. Experiments were performed to examine the effects of the voltage of the electron beam and the total dose of electrons.

TABLE 1

|  | Crosslinked | T-peel Strength (kN/m) | | | | | | | Dynamic Shear Strength** ($kN/m^2$) |
| --- | --- | --- | --- | --- | --- | --- | --- | --- | --- |
|  |  | #1 | #2 | #3 | #4 | #5 | #6 | #7 |  |
| BACN-1 | No | 0.68 | 0.82 | 0.89 | Blocked* | 1.09 | 0.61 | 1.31 | 338 |
|  | Yes | 0.28 | 0.26 | 0.21 | 0.18 |  |  |  | 365 |
| BACN-6 | No | 0.30 | 0.53 | 0.77 | Blocked* |  |  |  | 359 |
|  | Yes | 0.39 | 0.37 | 0.28 | 0.26 | 1.28 | 0.56 | 1.58 | 234 |
| BACNI | No | 0.65 | 0.74 | 0.7 | Blocked* |  |  |  | 345 |
|  | Yes | 0.32 | 0.26 | 0.3 | 0.44 | 0.96 | 0.44 | 1.17 | 248 |

**Dynamic shear is measured after 1 minute of polymer face to polymer face contact (dwell time).
*Blocked in less than one hour.
1. T-peel force after 1 minute of dwell time.
2. Rebonded after #1 and measured after 1 more minute of dwell time.
3. Rebonded after #2 and measured after 1 more minute of dwell time.
4. Rebonded after #3 and measured after 4 more minutes of dwell time.
5. Rebonded after #4 and measured after 16 hours of dwell time.
5. T-peel force measured after 4 minutes of dwell time.
7. T-peel force measured after 16 hours of dwell time.

In a second set of samples, the acrylonitrile proportion of the polymer was varied from 19% to 45% and the Mooney viscosities were varied from 43 to 65. Initial peel forces did not vary significantly at short times between the crosslinked and the non-crosslinked samples.

For comparison, samples were made with SBS and SIS block copolymers. See the samples using SBS and SIS in Table 2.

Samples 2A–2F were hot melt extruded from a Haake extruder with a 5-inch (12.7 cm) wide film die. The temperature profile in the extruder was: die 175°–180° C., zone 1 135°–145° C., zone 2 135°–145° C. zone 3 160°–170° C. All hot melt coated samples were coated using these same extrusion conditions. The contact responsive layers were coated onto a 0.127 mm thick spun bonded HDPE manufactured by DuPont under the trade name Tyvek™ 1073D films at a thickness of 5 mils (0.127 mm). Prior to coating, the Tyvek™ films were corona treated to improve the bonding of the rubber to the substrate. The T-peel strength results for six samples are given in Table 3:

TABLE 3

T-PEEL STRENGTH (kN/m)

| Dwell Time (min) | 2A | 2B | 2C | 2D | 2E | 2F |
|---|---|---|---|---|---|---|
| 0.5 | 0.10 | 0.15 | 0.04 | 0.04 | 0.01 | 0.00 |
| 1 | 0.17 | 0.18 | 0.05 | 0.06 | 0.02 | 0.00 |
| 2 | 0.23 | 0.26 | 0.07 | 0.07 | 0.04 | 0.00 |
| 5 | 0.52 | 0.36 | 0.11 | 0.08 | 0.06 | 0.00 |
| 12 Days | Blocked | Blocked | Blocked | Blocked | 0.53 | 0.04 |
| 0.5* | 0.13 | 0.19 | 0.07 | 0.03 | 0.04 | 0.00 |
| 1* | 0.13 | 0.25 | 0.10 | 0.06 | 0.05 | 0.00 |
| 2* | 0.16 | 0.27 | 0.13 | 0.08 | 0.05 | 0.00 |
| 5* | 0.23 | 0.25 | 0.14 | 0.08 | 0.07 | 0.00 |
| 0.5** | 0.11 | 0.13 | 0.06 | 0.04 | NT | NT |
| 1** | 0.11 | 0.15 | 0.08 | 0.05 | NT | NT |
| 2** | 0.17 | 0.19 | 0.09 | 0.07 | NT | NT |

*First Repeat. Surfaces of the fastener stored unmated. Test repeated 12 days later.
**Second Repeat. Test repeated immediately following first repeat.
2A Exposed to 1 Mrad at 150 keV.
2B Exposed to 1 Mrad at 200 keV.
2C Exposed to 3 Mrad at 175 keV.
2D Exposed to 5 Mrad at 150 keV.
2E Exposed to 5 Mrad at 200 keV.
2F Exposed to 10 Mrad at 150 keV.

Exposure to 10 Mrad ($10^6$ rad) with an electron beam energy of 150 keV was sufficient to essentially remove all peel strength. Samples given lower exposures (i.e., less than 10 Mrad exposures) blocked after 12 days of surface contact except one sample given a dose of 5 Mrad with a beam energy of 200 keV.

Further experiments were performed to measure the effect of dose on the T-peel strength at shorter times. These samples were hot melt coated at a thickness of about 0.127 mm onto a backing comprised of 60% polyester and 40% cellulose with an acrylic binder (International Paper Co. Grade no. 1309215). The polymer in the samples contained 1.25% Agerite Staylite S antioxidant (R. T. Vanderbilt Co., product code 02909). The results for doses from 0.0 to 1.4 Mrads and an electron energy of 175 keV are shown in Table 4.

TABLE 4

T-Peel (kN/m)

| Dose (Mrad @ 175 keV) | 2E | 2F | 2G | 2H |
|---|---|---|---|---|
| 0 | 0.5690 | 0.7002 | 0.7002 | 0.7002 |
| 0.2 | 0.3764 | 0.4377 | 0.4814 | 0.5690 |
| 0.4 | 0.5515 | 0.6128 | 0.6303 | 0.7002 |
| 0.6 | 0.4814 | 0.5515 | 0.5952 | 0.6653 |
| 0.8 | 0.2801 | 0.3939 | 0.3939 | 0.5515 |
| 1.0 | 0.3939 | 0.4814 | 0.5252 | 0.6565 |
| 1.2 | 0.3064 | 0.3501 | 0.4027 | 0.5690 |
| 1.4 | 0.1751 | 0.2188 | 0.2451 | 0.2451 |

2E had 0.5 minute dwell time
2F had 1 minute dwell time
2G had 2 minutes dwell time
2H had 5 minutes dwell time

EXAMPLE 3

In another test to ascertain the effect of crosslinking, chunks of about 6 cm×6 cm×12 cm of partly crosslinked BACN-4 were mixed with BACNI-2 in a ratio of 15% by weight to 85% by weight, respectively. About 1.25% Agerite Staylite S antioxidant was also added. Considerable mixing effort of the melted polymers was required to obtain uniform mixing of the two polymers. The mixture was hot melt coated as described in Example 2 at 5 mils (0.127 mm) thickness onto a backing of polyvinyl chloride (0.03 mm thick). The polymer face to polymer face T-peel strength (5 min. dwell time) was 0.48 kN/m for the mixture compared to 0.66 kN/m without any crosslinked polymer. On a backing of 60% polyester and 40% cellulose with a dwell time of five minutes, the peel force was 0.46 kN/m for the mixture compared with 0.70 kN/m without any crosslinked polymer.

EXAMPLE 4

A comparison of four anti-blocking agents and samples with no anti-blocking agent was performed. Each sample used BACNI and a mixture of dry ingredients that included 1.5% by weight Cyanox™ LTDP (American Cyanamid), 1.5% by weight Irganox™ 1076 (Ciba Geigy), 0.25% by weight Tinuvin™ 328 (Ciba Geigy), and 0.25% by weight Tinuvin™ 770 (Ciba Geigy). A 0.127 mm thick fastening layer was hot melt coated as described in Example 2 onto about 0.05 mm primed PET film. Samples 4A, 4B, 4C and 4D used BACN-1. Sample 4E used BACN-2. Samples of BACNI-1 were used with the other anti-blocking agents. Unfastened samples were exposed to air, fluorescent room light and dust for up to 7 days. The test results are shown in Table 5 are based on a 5-minute room temperature dwell. Sample 4A employed no anti-blocking agent. Samples 4B, 4C, 4D and 4E employed 2.5% by weight Cab-O-Sil™, 1% by weight CaSiO$_4$, 1% by weight CaCO$_3$ and 5% extra talc, respectively.

TABLE 5

Initial T-Peel/% Initial T-Peel After Exposure

| Exposure Time (Days) | 4A | 4B | 4C | 4D | 4E |
|---|---|---|---|---|---|
| 0 | 0.5252/ 100% | 0.3064/ 100% | 0.4377/ 100% | 0.6128/ 100% | 0.7441/ 100% |
| 1 | 0.1751/ 33% | 0.1313/ 42.9% | 0.3501/ 80% | 0.1663/ 27.1% | 0.6128/ 82.4% |
| 4 | 0.0910/ 17.3% | 0.1401/ 45.7% | 0.0613/ 14% | 0.1050/ 17.1% | 0.1401/ 18.8% |
| 7 | 0.0088/ 1.67% | 0.0700/ 22.9% | 0.0175/ 4.0% | 0.0263/ 4.3% | 0.0193/ 2.6% |

The initial T-peel strength of these samples are shown as the top value (kN/m) in each box and the % of initial T-Peel strength is shown as the bottom number. These results demonstrate loss of initial T-peel strength with exposure. Sample 4B (2.5% Cab-O-Sil™ SiO$_2$, Cabot Corp.) anti-blocking agent gave the best results. The other anti-blocking agents were CaSiO$_4$ (Hubersorb 600, J.M. Huber Corp.) and CaCO$_3$ (Atomite, ECC International).

Some degree of crosslinking can be obtained by hot melt extruding BACN or BACNI. The exact amount of crosslinking was not determined. This example demonstrates that low peel strengths can be obtained from hot melt extruded samples with or without addition of antiblocking agents. Antiblocking agents can be added to control the fastening properties. Combining partial crosslinking from hot melt extrusion with the addition of fillers provides an easy way to obtain a greater range of fastening properties than had been possible previously.

EXAMPLE 5

The effect of the thickness of the fastening layer was measured. BACNI-2, which had 2% Agerite Staylite S was hot melt coated as described in Example 2 onto either 0.05 mm primed PET film or Guilford tricot knit cloth, style #15771. The samples were tested after a 2 minute dwell time at room temperature. The results are shown in Table 6.

TABLE 6

| Backing | Fastening Layer Thickness (mm) | T-Peel (k/N/m) |
|---|---|---|
| Primed PET | 0.05 | 0.2854 |
| Primed PET | 0.075 | 0.3764 |
| Primed PET | 0.10 | 0.4464 |
| Primed PET | 0.13 | 0.5830 |
| Tricot cloth | 0.10 | 0.0735 |
| Tricot cloth | 0.13 | 0.1488 |
| Tricot cloth | 0.20 | 0.3501 |

EXAMPLE 6

Further experiments were performed to show the effect of surface texture on peel strength. BACNI-2 containing 1.5% by weight Cyanox™ LTDP, 1.5% by weight Irganox™ 1076, 0.25% by weight Tinuvin™ 328 and 0.25% by weight Tinuvin™ 770 was hot melt coated as described in Example 2 to a thickness of 5 mils (0.127 mm) onto 0.05 mm thick primed PET film. The still hot polymer-coated film was passed between two rolls of a nip. A smooth surface was produced using a 0.051 mm BOPP film between the roller and polymer. A "rubber roller matte" surface was introduced just by passing the hot polymer directly through the rubber rollers. An even rougher surface, i.e., textured matte, was produced by placing a textured film between the roller and the hot rubber. Table 7 compares T-peel strength at various dwell times up to five minutes. The smooth surface gives the highest strength, and the textured matte surface gives the lowest strength. These results indicate that the peel strength varies with the amount of surface contact.

TABLE 7

| Surface | Dwell Time (Min) | T-Peel (kN/m) |
|---|---|---|
| Smooth | 0.5 | 0.5690 |
| Smooth | 1.0 | 0.8754 |
| Smooth | 2.0 | 0.9156 |
| Smooth | 5.0 | 0.9979 |
| Rubber matte | 0.5 | 0.4814 |
| Rubber matte | 1.0 | 0.6128 |
| Rubber matte | 2.0 | 0.7528 |
| Rubber matte | 5.0 | 0.7528 |
| Textured matte | 0.5 | 0.1751 |
| Textured matte | 1.0 | 0.2171 |
| Textured matte | 2.0 | 0.2171 |
| Textured matte | 5.0 | 0.2171 |

EXAMPLE 7

Guilford Knit cloth, style #15771, was hot melt coated as described in Example 2 with a 0.203 mm thick layer of BACNI-2 containing 2% Agerite Staylite™ S antioxidant. Half of the samples were covered with a 0.102 mm thick PE liner. The other half of the samples were left uncovered.

The covered (i.e., linered) and uncovered (i.e., unlinered) samples were tested for T-Peel strength under various conditions. In a first set of experiments, some of the unlinered samples were exposed to fluorescent room light, air and dust. Others of the unlinered samples were protected from fluorescent light and dust by being placed in a Bell Jar. Initially, all of the samples had a T-Peel strength of 0.79 kN/m. Those unlinered samples that were not protected from the exposure to fluorescent light and dust lost virtually all strength by 18 days. Those unlinered samples that were in the Bell Jar retained a T-Peel strength of about 0.35 kN/m after 10 months.

In a second set of experiments, linered and unlinered samples were exposed to UV light (2 mW/cm$^2$) for varying times and then tested for T-Peel strength after a 5-minute dwell time. The results of these tests are shown in Table 8.

TABLE 8

| Sample | Time Under UV Light (Hrs.) | Total Exposure (mJ) | T-Peel (kN/m) |
|---|---|---|---|
| Linered | 0 | 0 | 0.79 |
| Linered | 2 | 1,440 | 0.44 |
| Linered | 5.5 | 3,960 | 0.175 |
| Linered | 7 | 50,400 | 0.0875 |
| Linered | 9 | 64,800 | 0.0595 |
| Linered | 11 | 79,200 | 0.051 |
| Unlinered | 0 | 0 | 0.79 |
| Unlinered | 1.5 | 10,800 | 0.432 |
| Unlinered | 3 | 21,600 | 0.201 |
| Unlinered | 7 | 50,400 | 0.0928 |

The implication is that a major part of the loss of peel strength with time is due to ultraviolet light induced oxidation when a sufficient amount of an effective antioxidant is not present. A variety of antioxidants and UV stabilizers can be used to minimize or eliminate UV light induced oxidation. Addition of stabilizers during the manufacture of the polymer would be the best approach for blending the antioxidant and UV stabilizers for hot melt extrusion or any type of coating process.

EXAMPLE 8

This example illustrates that the peel strength of a fastener system can be controlled by selecting the properties of the target surface to which the contact responsive fastening layer is attached. The example shows that varying the solubility parameter of the target surface by selecting the target surface from a range of materials permits one to control the peel strength of the fastening system.

BACN-6 was dissolved in MEK and then solvent-coated onto a 0.025 mm thick corona treated polyester backing to give a nominal dry thickness of 0.017 mm. The resulting fastening layers were tested for 180° peel strength from a variety of smooth target surfaces. A 10-minute dwell time was used. Table 9 demonstrates the variation of 180° peel force as a function of the solubility parameter of the smooth target surface. Where available, single point values were used instead of ranges. The solubility parameter of BACN-6 was not itself measured. However, the solubility parameter for a 70% butadiene, 30% acrylonitrile is in the range of 9.38–9.48 (cal/ml)$^{1/2}$. It was assumed that the solubility parameter for BACN-6 would be essentially the same.

TABLE 9

| Target Surface | Solubility Parameter (cal/ml)$^{1/2}$ | 180° Peel Strength (kN/m) |
|---|---|---|
| PE | 7.9 | 0 |
| PP | 8.7* | 0.197 |
| PS | 9.1 | 0.81 |
| PMMA | 9.2 | 1.1489 |
| PVC | 9.5 | 1.2583 |
| PC | 9.5 | 1.2583 |
| PET | 10.7 | 0.569 |
| Epoxy | 10.9 | 0.3392 |
| CA | 13.4 | 0.0547 |
| Nylon | 13.6 | 0.0438 |

*This represents the mid-point of the range of solubility parameters found in the open literature.

Table 9 demonstrates that the 180° peel strength of a fastener prepared from BACN can be varied by appropriate choice of solubility parameter of the target surface material used to attach to the non-tacky fastening surface.

EXAMPLE 9

BACNI-2 was hot melt coated onto a 1.7 mil (0.043 mm) thick unplasticized poly vinyl chloride (UPVC) film at a 7.3 mil (0.185 mm) coating thickness as described in Example 2. The polymer contained from 3–7% talc. The resultant fasteners were then tested for 90° peel strength after a 3-day dwell time against various target surfaces to study the effect of solubility parameter on peel strength. The DuPont Base Coat/Clear Coat 871/RK7103 and the White High Solids Enamel BASF E172 were tested after a somewhat different dwell time than the other samples. The 22° C. dwell time was 24 hours. The elevated temperature dwell time was 46 hours at 70° C. Table 10 shows the variation of the 90° peel strength depending on the target surface mated with the non-tacky fastening layer at two different temperatures.

TABLE 10

90° Peel Strength (kN/m)

| Target Surfaces | Temperature 22° C. | Temperature 49° C. | Dwell Time (Hr.) |
|---|---|---|---|
| PC | 3.02 | 2.98 | 72 |
| ABS | 3.50 | 3.94 | 72 |
| PMMA | 2.98 | 3.37 | 72 |
| PA | 0.70 | 3.50 | 72 |
| Glass | 0.21 | 0.24 | 72 |
| EVA | 0.40 | 0.42 | 72 |
| PET | 0.32 | 0.39 | 72 |
| Corona Treated PET | 0.36 | 0.44 | 72 |
| LDPE | 0.03 | 0.04 | 72 |
| HDPE | 0.03 | 0.04 | 72 |
| Surlyn ™ | 0.09 | 0.13 | 72 |
| PS | 0.03 | 0.04 | 72 |
| DuPont Base Coat/ Clear Coat 871/RK7103 | 0.23 24 hr. | 0.21 46 hr. 70° C. | 24 hr RT 46 hr. 70° C. |
| White High Solids Enamel BASF E172 | 0.20 24 hr. | 0.20 46 hr. 70° C. | 24 hr RT 46 hr. 70° C. |

EXAMPLE 10

Samples of uncrosslinked BACNI-1 containing 2% by weight Irganox™ 1010 antioxidants were solvent coated as described in Example 1 onto one side of a 0.0021 mm thick primed PET which had a 0.05 mm thick tacky pressure sensitive adhesive. The adhesive was covered with a paper liner on the opposite side. The resultant fasteners were then tested for 90° peel strength at room temperature to various target surfaces after a one-day dwell time at 22° C. and 70° C. to study the effect of solubility parameter on peel performance. The results are given in Table 11.

TABLE 11

90° Peel Strength (kN/m)

| Target Surface | 22° C. | 70° C. |
|---|---|---|
| SS | 0.236 | 0.336 |
| PC | 1.138 | 1.313 |
| PMMA | 1.138 | 1.251 |
| PP | 0.145 | 0.123 |
| HDPE | 0.053 | 0.053 |
| LDPE | 0.044 | 0.039 |
| PS | 0.648 | 0.648 |
| ABS | 1.750 | 1.260 |
| Rigid Filled PVC | 0.508 | 1.496 |
| Glass | 0.161 | 0.149 |
| DuPont Base Coat/Clear Coat 871/RK7103 | 0.341 | 0.257 |
| White High Solids Enamel BASF E172 | 0.350 | 0.257 |
| BOPP | 0.123 | 0.136 |

EXAMPLE 11

A fastening system according to the invention was prepared as follows:

A composition containing 70% by weight acrylate capped polycaprolactone urethane oligomer, 30% by weight isooctyl acrylate, and 0.25% 1-hydroxycyclohexyl acetophenone was coated onto one side of a 0.036 mm UPVC film which had a 0.05 mm tacky pressure sensitive adhesive layer with a paper liner on the opposite side. The fastening layer was cured with 240–280 mJ of high intensity ultraviolet light through a filter which removed wavelengths below 300 nm. The samples were cured through a 0.05 mm BOPP cover film to prevent oxygen inhibition.

The resultant fastening system was tested for 90° peel strength at room temperature against various surfaces after a 24 hr dwell at 22° C. and 46 hr dwell at 70° C. The results are given in Table 12.

TABLE 12

90° Peel (kN/m)

| Target Surfaces | 24 hr 22° C. | 46 hr 70° C. |
|---|---|---|
| SS | 0.324 | 0.560 |
| PC | 0.499 | 0.446 |
| PMMA | 0.481 | 0.450 |
| PP | 0.023 | 0.012 |
| HDPE | 0.026 | 0.013 |
| LDPE | 0.016 | 0.014 |
| PS | 0.219 | 0.096 |
| ABS | 0.494 | 0.502 |
| Rigid Filled PVC | 0.516 | 0.630 |
| Glass | 0.350 | 0.411 |
| DuPont Base Coat/Clear Coat 871/RK7103 | 0.205 | 0.288 |
| White High Solids Enamel BASF E172 | 0.210 | 0.228 |

EXAMPLE 12

Butyl rubber (Chlorobutyl 1255, Polysar Rubber Corp.) was solvent coated from a 25% solution in hexane to a thickness of about 0.063 mm onto a 0.0254 mm thick corona treated PET. The resultant fastener was then tested for 90° peel strengths at room temperature against a variety of surfaces after a dwell time of 3 hours at 22° C. The results are given in Table 13.

TABLE 13

| Target Surface | 90° Peel Strength (kN/m) |
|---|---|
| White painted metal | 0.4025* |
| Blue painted metal | 0.21875 |
| HDPE | 0.0875 |
| LDPE | 0.0875 |
| PVC | 0.105 |
| PC | 0.30625 |
| PMMA | 0.48125* |
| SS | 0.245 |
| Glass | 0.21 |

*The peel strength was greater to the substrate than to the backing.

Table 13 shows the same principle of varying the adhesive force by altering the material on the opposite surface of the fastener. The fastener layer exhibited slight finger tack. Also, it should be noted that fillers may be added to reduce tackiness. This is especially true with butyl rubbers.

EXAMPLE 13

Fasteners constructed from either hot-melt coated BACNI-2 (FS-1), uncrosslinked solvent coated BACNI-1 (FS-2), and ultraviolet cured UA (FS-3) (as described in Example 11) were used in the production of diapers which have as part of their construction a fastening tape, a release tape, and a frontal tape. The fasteners were made both with a fastening layer-to-fastening layer approach (1C FS-3) and fastening layer-to-smooth target surface approach (FS-1 and FS-2). Suitable results were obtained using PET and BOPP target surfaces for FS-1 and FS-2 as the frontal tape. The non-tacky fasteners can be used in place of both the fastening tape and frontal tape. In FS-3 embodiment the release tape was eliminated. The fasteners were used on both cloth diapers and disposable type diapers. Satisfactory peel and shear performance was obtained. The fasteners can be washed several times without losing performance. It was noted, however, that fabric softeners coat the fastening layer surface. A fastener washed in the presence of a fabric softener must be cleaned to remove the softener and renew the surface of the fastening layer before reuse.

EXAMPLE 14

Sample disposable gowns were made with hot melt extruded BACNI-2 and ultraviolet curable UA (Example 11). These samples had satisfactory peel and shear. The BACNI-2 can be mated to PET or BOPP if not sufficiently crosslinked to prevent blocking to itself. The ultraviolet cured UA maintained adhesion after ETO (ethylene oxide gas) sterilization. Some peel performance was lost after 2–3 Mrads of Gamma sterilization. The BACNI-2 had acceptable fastener performance after 10 mrads of Gamma sterilization.

EXAMPLE 15

Tests were performed with UA (Example 11) and BACNI-1 (Example 10) non-tacky fastener systems. A non-tacky fastener component in the form of a tape was bonded to the floor. A non-tacky target surface component in the form of a tape was attached to the carpet piece. For the test, industrial grade Milliken (GR 10 Modular) carpet was used. For the UA system both target and fastening surfaces of the fastener system were the UA material. For the BACNI-1 system, non-tacky fastener secured to the floor was BACNI-1 while the target surface attached to the carpet had a smooth surface of either PET or BOPP. The BACNI-1 was solvent coated to a 0.051 mm thickness, was uncrosslinked, and contained 2% Irganox™ 1010. These fasteners had peel and shear strengths that are acceptable in comparison with hook and loop attachments. Tests were performed using 2.54 cm wide strips of fastener and 39.7 mm wide strips of carpet. Testing after one hour of dwell at room temperature (22° C.) yielded the following results:

TABLE 14

| Sample Combination (Fastener/Target) | 90° Peel Strength (kN/m) | Dynamic Shear (kN/m$^2$) |
|---|---|---|
| UA/UA | 0.9 | 329.0 |
| BACNI/BOPP | 0.27 | 81.6 |
| BACNI/PET | 0.62 | 130.6 |

It is noted that this Example was not a true 90° peel strength test because the backing was too rigid. Peel angle and backing rigidity affect peel strength.

EXAMPLE 16

Tests were performed using BACNI-2 non-tacky fasteners. The BACNI-2 also contained 2% Agerite Staylit™ S antioxidant. The composition was hot melt extruded as described in Example 2 to a thickness of 0.12 mm (about 5 mils) onto a polyester film which was thereafter laminated to the back of abrasive grinding disks (Grade 80 3M Stikit™ Gold) using a tacky pressure sensitive adhesive. The target surfaces were two backup pads (6" (15.2 cm) Stikit™ Disk Pads, Part No. 05114405576) with one having a two mils (0.005 cm) thickness of BOPP laminated onto the face of the pad and the other having a 0.076 mm thickness of polyester laminated onto the face of the pad with PSA. This embodiment is shown in FIG. 5.

A standard screening test was utilized to evaluate the attachment ability of the non-tacky fastener. The test employs the use of a National Detroit DAQ, dual action air sander (DA) and a 14 gauge steel panel formed with a concave rise. The test progresses from sanding on a flat surface (Mode 1), to sanding across an incline with the backup pad raised 10 degrees from the surface (Mode 2), and finally to sanding across the incline with the backup pad raised 45 degrees from the surface (Mode 3). The non-tacky fastener systems worked well, passing the test as shown in Table 15. In this table, the rating guidelines were as follows:

Grade 5=Satisfactory

Grade 4=Edge Lifting

Grade 3a=Slight Puckering

Grade 3B=Slight Edge Lifting

Grade 2=Severe Wrinkling and Puckering

Grade 1=Disk Fly Off

Test Guidelines:

1) Any rating of 1 or 2 is a failure.
2) A rating of 3a, 3b, or 4 is not a failure in itself. However, if two of the three modes are not rated "5", the adherence quality may be questionable.

TABLE 15

| Attachment Face | Trial | Mode 1 | Mode 2 | Mode 3 | Comments |
|---|---|---|---|---|---|
| PET | 1st | 5 | 5 | 5 | Felt good |
| PET | 2nd | 5 | 5 | 3a | 15% pad contact loss on edge of disk |
| BOPP | 1st | 5 | 5 | 5 | Felt good |
| BOPP | 2nd | 5 | 5 | 5a | 15% pad contact loss on edge of disk. |

The prepared coated abrasive disks and backup pads were also used to evaluate the effectiveness of the non-tacky fastener during the high temperature sanding of wood. In these tests, a Milwaukee ⅜ inch (0.95 cm) electric drill was used to sand an oak board for 5 minute intervals. The BACNI-2 fastener again showed good adhesion to both the PET and BOPP film surfaces, although the PET film had slightly better release properties.

EXAMPLE 17

About 0.076 mm of water soluble adhesive (EG2326-UN from H.B. Fuller Co.) was coated and dried onto one side of a 20.45 kg Waterleaf™ repulpable paper backing. One sample of fastener, the UA polymer of Example 11 was coated at a thickness of about 0.05 mm onto the other side of the backing and cured with about 200 millijoules of high intensity light to produce a fastener with a smooth flat surface.

A second sample having a smooth linear groove fastening surface was prepared as in Example 17 of U.S. Pat. No. 5,196,266 (Lu et al.), supra. Two of the resulting non-tacky fastener surfaces were pre-mated to ensure proper alignment. They were then cut to the desired size, about 12.6 mm×25.4 mm. The precut and pre-mated fasteners were moistened with water on the two outside water soluble layers and were applied to the flap of an interoffice envelope. The resulting combination was tested and found to function acceptably as a reclosable envelope. A smooth linear groove contact fastening surface had improved contamination resistance over the non-grooved, flat version. The tested envelopes passed the appropriate repulpability test. A BACN fastener with one surface being a BOPP film would also perform satisfactorily in this application.

EXAMPLE 18

A Quick Tack measuring system was utilized to measure the peel force of a set of the non-tacky fastening layer and certain pressure sensitive adhesives. The peel force is measured at a ninety degree angle from the surface where any peel force results just from contact with essentially no external pressure added other than the weight of the tape. An IMASS tensile tester with a 0.455 kg load cell was employed. Four fastening layer materials disclosed above were tested: (1) BACNI-1 polymer, (Example 10 at 0.021 mm thickness), (2) UA (Example 11) at 0.02 cm thickness, (3) a tackified block copolymer comprising 75% by weight Kraton G1657 (styrene-ethylene-butadiene-styrene (SEBS)) and 25% by weight Regalrezm 1085 at 0.013 cm thickness (M), and (4) the low tack repositionable pressure sensitive adhesive composition (Scotchbrand Differential Tack Double Coated Tape 9415 with Post-it™ adhesive on one side) from 3M. The results of these tests are set out in Table 16.

TABLE 16

|  | BACNI | UA | M | Post It ® Adhesive |
|---|---|---|---|---|
| Bondpaper[a] | 0.0004 | 0.0000 | 0.0008 | 0.244 |
| Newspaper[b] | 0.0000 | 0.0000 | 0.0000 | 0.0152 |
| Legal Pad[c] | 0.0000 | 0.0000 | 0.0000 | 0.0044 |

[a]Bondpaper, 3M Copy White Bond Paper, Stock No. 78-6969-6135.
[b]Newspaper, Minneapolis Star Tribune 2/22/93 non-inked portion.
[c]Legal Pad, St. Paul Book and Stationary Stock No. 91242-969.

This demonstrates the essentially no-tack characteristic of the M, UA, and BACN fastener layer materials as compared with the tack (although generally known as an example of a low tack material) of the Post It™ adhesive.

EXAMPLE 19

Contact responsive fasteners perform best when mated to a smooth surface. A Surface Roughness Test was used to measure the smoothness. In Table 17 the averages of the absolute departures from the centerline of the roughness profile of a surface for a variety of non-tacky fastener and target surfaces.

TABLE 17

|  | Microns |
|---|---|
| 0.014 mm mil PET film | 0.042 |
| 0.051 mm BOPP film | 0.033 |
| White bond copier paper | 1.5 |
| Glass | 0.01 |
| 0.051 mm UV cured UA | 0.297 |
| 0.021 mm mil solvent coated BACNI-1 | 0.376 |
| 0.127 mm hot melt coated BACNI-2 | 0.326 |
| Texture hot melt coated BACNI-2 | 1.1 |
| 0.013 mm solvent coated SEBS (75/25 ratio) | 0.12 |

EXAMPLE 20

Tests were performed to examine the effect of a large number of unfastening and refastening operations on the 90° peel force. Tests were performed with non-tacky fastener coated onto 0.036 mm UPVC that was attached with 0.051 mm tacky pressure sensitive adhesive to a 0.014 mm PET support. The 90° peel forces were measured with a 2.54 cm wide strip of non-tacky fastener using a one minute dwell time. Table 18 shows the results for 0.021 mm thick solvent coated BACNI-1 peeled from a glass target panel and 0.051 mm thick UA peeled from a PMMA target panel. After each one hundred peels, the adhesives were rolled against the desired target panel with a 2 kg. roller using one pass in each direction.

TABLE 18

| | 90° Peel Strength (kN/m) Fastener/Target | |
|---|---|---|
| Cycle No. | BACNI/Glass | UA/PMMA |
| 1 | 0.11 | 0.20 |
| 100 | 0.11 | 0.18 |
| 200 | 0.11 | 0.16 |
| 300 | 0.13 | 0.15 |
| 400 | 0.14 | 0.25* |
| 500 | 0.17 | 0.24 |
| 600 | 0.17 | 0.27 |
| 700 | 0.17 | 0.20 |

TABLE 18-continued

| | 90° Peel Strength (kN/m) Fastener/Target | |
|---|---|---|
| Cycle No. | BACNI/Glass | UA/PMMA |
| 800 | 0.18 | 0.22 |
| 900 | 0.16 | 0.22 |
| 1000 | 0.17 | 0.19 |
| 1100 | 0.16 | 0.19 |
| 1200 | 0.16 | 0.18 |
| 1300 | 0.15 | 0.18 |
| 1400 | 0.15 | 0.17 |
| 1500 | 0.15 | 0.17 |
| 1600 | 0.16 | 0.16 |
| 1700 | 0.16 | 0.17 |
| 1800 | 0.15 | 0.15 |
| 1900 | 0.14 | 0.14 |
| 2000 | 0.14 | 0.15 |

*Test stopped after 300 cycles and restarted about 24 hours later.

The data in this Table show the relatively low and constant peel strength over multiple releases and refastenings of the fastener of the invention.

EXAMPLE 21

Two samples of urethane (UR) non-tacky fasteners were prepared. The UR was coated out as a fastening layer on UPVC.

The urethanes were prepared by heating polyol(s) in a glass jar at 70° C. until melted, adding an isocyanate-containing component with stirring until well blended, and then adding 4 drops of a 1% solution by weight of dibutyltin dilaurate (DBTDL) in propylene glycol monomethyl ether acetate (PM Acetate from Union Carbide). The resultant urethanes were cast as a 0.10 mm (4 mils) thick layer on one side of 0.05 mm (2 mils) thick UPVC film that had a pressure sensitive adhesive on the other side. The resultant tape was then cured at 74° C. for 24 hours and allowed to dwell at room temperature for about 1 week before testing for 90° peel against various target surfaces.

The ingredients used to make the UR and the 90° peel test results are given in Table 19 below. The quantities of the ingredients are reported in parts by weight. The samples had no tack when tested against paper.

TABLE 19

| Ingredient | Sample A | Sample B |
|---|---|---|
| Tone ™ 200 | 100 | 36.7 |
| Tone ™ 310 | — | 31.2 |
| IPDI | 39.9 | — |
| MPCHI | — | 32.1 |
| 90° Peel (kN/m) | | |
| 2 min. dwell @ RT | | |
| (a) to self | 0.028 | 0.016 |
| (b) to glass | 0.087 | 0.061 |
| 24 hr. dwell @ RT | | |
| (a) to self | 0.525 | 0.044 |
| (b) to glass | 0.096 | 0.105 |
| (c) to SS | 0.087 | 0.149 |
| 46 Hr. dwell @ 70° C. | | |
| (a) to self | 1.93 | 0.121 |
| (b) to glass | 0.788 | 0.376 |
| (c) to SS | 1.24 | 0.481 |

Tone™ 200 is a difunctional caprolactone polyol, MW 530, commercially available from Union Carbide Corporation, Danbury, Conn. Tone™ 310 is a trifunctional caprolactone polyol, MW 900, commercially available from Union Carbide Corporation, Danbury, Conn. IPDI is isosphorone diisocyanate, commercially available from Hüls, Germany. MPCHI is methylene bis (4-cyclohexylisocyanate), commercially available as Desmodur™ W from Mobay Chemical Corporation (now known as Miles, Inc.), Pittsburgh, Pa.

EXAMPLE 22

Six samples of acrylic (AC) non-tacky fasteners were prepared. The AC compositions were each coated out as a fastening layer on primed PET.

The acrylic compositions were prepared by solution polymerization as outlined in U.S. Pat. No. Re. 24,906 (Ulrich) using a 40% solids content solution of the monomers and ethyl acetate, 0.3% 2-2'-azobis(isobutyronitrile) initiator (Vazo® 64, commercially available from E. I. duPont de Nemours) and heating the mixture at 55° C. for 24 hours. The resultant acrylic compositions were each cast as a film which had a dry thickness of about 0.025 mm (1 mil) onto a 0.038 mm (1.5 mils) primed PET. The resultant tape was allowed to equilibrate at RT for about 24 hours before testing for T-peel strength against various target surfaces.

The sample compositions are given in Table 19. Fastening layers, target surfaces, and T-peel test results are reported in Table 20. The quantities of ingredients are reported in parts by weight. The samples had no tack when tested against paper.

TABLE 19

| | Parts by Weight Monomer | | | | | | |
|---|---|---|---|---|---|---|---|
| Monomer | AC1 | AC2 | AC3 | AC4 | AC5 | AC6 | AC7 |
| Ethyl acrylate | 70 | 60 | — | — | — | — | — |
| Butyl acrylate | 20 | 30 | 40 | 40 | 20 | 10 | — |
| Acrylic acid | 10 | 10 | — | — | — | — | — |
| Isobornyl acrylate | — | — | 50 | 50 | — | — | — |
| 2-Sulfoethylmeth-acrylate | — | — | 10 | — | — | — | — |
| 2-Acrylamido-2-methyl-propane sulfonic acid | — | — | — | 10 | — | — | — |
| Methyl acrylate | — | — | — | — | 70 | 80 | — |
| Dimethylamino-ethylmethacrylate | — | — | — | — | 10 | 10 | 10 |
| Ethyl acrylate | — | — | — | — | — | — | 90 |

TABLE 20

| Fastening Layer/ | T-Peel (kN/m) | |
|---|---|---|
| Target Surface | 2 minute RT dwell | 1 week RT dwell |
| AC1/AC1 | 0.289 | 0.641 |
| AC2/AC2 | 0.287 | 0.588 |
| AC3/AC3 | 0.737 | 0.852 |
| AC4/AC5 | 0.238 | 0.334 |
| AC4/AC6 | 0.238 | 0.3185 |
| AC4/AC7 | 0.229 | 0.313 |

EXAMPLE 23

A sample of a polyethylene copolymer blend composition (P) was extruded out as a fastening layer.

The composition was prepared by dry mixing together equal parts by weight polyethylene copolymer (85% ethylene and 15% butene with 0.8% by weight of microtalc) (DFDB 1085, commercially available from Union Carbide, Danbury, Conn.) and polyethylene copolymer (96% ethylene and 4% octene) (LLDPE 6806, commercially available from Dow Chemical Co., Midland, Mich.) and feeding the mixture through an extruder and single layer die (both extruder and die at a temperature of about 220° C.) to yield a 0.076 mm thick layer. From the die the layer was carried on a chrome casting roll (roll temperature 10° C. to 23° C.) to a windup roll where the layer was wound around a paper core. The resultant roll was allowed to dwell at RT for about 4 months before testing for 900 peel strength against various target surfaces.

Target surfaces and 90° peel test results are reported in Table 21 below. The samples had no tack when tested against paper.

TABLE 21

| Target Surface | 90° Peel (kN/m) | |
| --- | --- | --- |
| | 2 minute RT dwell | 1 week RT dwell |
| Self | 0.083 | 0.072 |
| PC | 0.039 | 0.038 |
| PVC | 0.013 | 0.0185 |
| SS | 0.0375 | 0.021 |
| ABS | 0.011 | 0.027 |
| HDPE | 0.002 | 0.014 |
| LDPE | 0.014 | 0.024 |
| PP | 0.019 | 0.155 |
| PS | 0.000 | not tested |

We claim:

1. A method of applying a covering to a structure, in a manner that permits the covering to be multiply repositioned, the method comprising the step of:
   a) providing a contact responsive fastener comprising (i) a connecting means, and (ii) a contact responsive fastening layer that has essentially no surface tack and a low 90° peel strength of from at least 0.061 kN/m to about 5.0 kN/m to a glass target surface after a 2 minute dwell time at room temperature;
   b) attaching the contact responsive fastener to the structure by means of the connecting means; and
   c) contacting the contact responsive fastening layer with a target portion of the covering so that the covering is in repositionable attachment to the contact responsive fastening layer.

2. A method according to claim 1 wherein said connecting means comprises a layer of a tacky pressure sensitive adhesive on said contact responsive fastening layer.

3. A method according to claim 1 wherein the target portion of the covering has a different composition than the contact responsive fastening layer.

4. A method according to claim 1 wherein the contact responsive fastening layer is crosslinked.

5. A method according to claim 1 wherein the target portion of the covering comprises a material selected from the group consisting of a polymer, a metal, glass, paper and enamel.

6. A method according to claim 1 wherein the solubility parameter of the contact responsive fastening layer and the solubility parameter of the target surface each are sufficiently different to prevent blocking of the contact responsive fastening layer to the target surface.

7. A method of applying a covering to a structure, in a manner that permits the covering to be multiply repositioned, the method comprising the step of:
   providing a contact responsive fastener comprising (i) a connecting means, and (ii) a contact responsive fastening layer that has essentially no surface tack and a low 90° peel strength of from at least 0.061 kN/m to about 5.0 kN/m to a glass target surface after a 2 minute dwell time at room temperature;
   attaching the contact responsive fastener to the covering by means of the connecting means; and
   contacting the contact responsive fastening layer with a target portion of the structure so that the covering is in repositionable attachment to the structure.

8. A method according to claim 7 wherein said connecting means comprises a layer of a tacky pressure sensitive adhesive interposed between said contact responsive fastener and said covering.

9. A method according to claim 7 wherein the target portion of the structure has a different composition than the contact responsive fastener.

10. A method according to claim 7 wherein the contact responsive fastening layer is crosslinking.

11. A method according to claim 7 wherein the target portion of the structure comprises a material selected from the group consisting of a polymer, metal, glass, paper or enamel.

12. A method according to claim 7 wherein the solubility parameter of the contact responsive fastening layer and the solubility parameter of the target surface each are sufficiently different to prevent blocking of the contact responsive fastener to the target.

13. A method of applying a covering to a structure, m a manner that permits the covering to be multiply repositioned, the method comprising the step of:
   functionally attaching a contact responsive fastening layer to the structure, the contact responsive fastening layer having essentially no surface tack and a low 90° peel strength of from at least 0.06 kN/m to about 5.0 kN/m to a glass target surface after a 2 minute dwell time at room temperature; and
   contacting the contact responsive fastening layer with a target portion of the covering so that the covering is in repositionable attachment to the contact responsive fastening layer.

14. A method according to claim 13 wherein the step of functionally attaching the contact responsive fastening layer to the structure comprises the step of coating the contact responsive fastening layer onto the structure.

15. A method according to claim 13 further comprising the step of functionally attaching the target portion to the covering.

16. A method according to claim 13 further comprising the step of coating a target portion directly onto the covering.

17. A method according to claim 13 wherein at least a portion of the covering comprises the target portion.

18. A method of applying a covering to a structure, in a manner that permits the covering to be multiply repositioned, the method comprising the step of:
   functionally attaching a contact responsive fastening layer to the covering, the contact responsive fastening layer having essentially no surface tack and a low 90° peel strength of from at least 0.061 kN/m to about 5.0 kN/m to a glass target surface after a 2 minute dwell time at room temperature; and
   contacting the contact responsive fastening layer with a target portion of the structure so that the covering is in repositionable attachment to the structure.

19. A method according to claim 18 wherein the step of functionally attaching the contact responsive fastening layer to the covering comprises the step of coating the contact responsive fastening layer directly onto the covering.

20. A method according to claim 18 further comprising the step of functionally attaching the target portion to the structure.

21. A method according to claim 18 further comprising the step of coating a target portion directly onto the structure.

22. A method according to claim 18 wherein at least a portion of the structure comprises the target portion.

* * * * *

UNITED STATES PATENT AND TRADEMARK OFFICE
CERTIFICATE OF CORRECTION

PATENT NO.   : 5,888,335
DATED        : March 30, 1999
INVENTOR(S)  : James J. Kobe, Maurice E. Freeman, Bradley D. Zinke, and Shih-Lai Lu It is certified that error appears in the above-identified patent and that said Letters Patent is hereby corrected as shown below:

Title page, page 2,
Under "U.S. PATENT DOCUMENTS", the following references should be listed:
-- 4,828,871  5/1989  Strobel et al. --
-- 4,844,979  7/1989  Strobel et al. --;

Title page, page 2,
Under "FOREIGN PATENT DOCUMENTS ", the following references should be listed:
-- 0 443 263  12/1990  European Pat. Off. --
-- 0 513 772  11/1992  European Pat. Off. --;

Column 7,
Line 21, "preniated" should read -- premated --;

Column 9,
Line 59, "hard rubber" should read -- hard-rubber --;

Column 12,,
Line 58, "C. zone 3" should read -- C., zone 3 --;

Column 14,
Line 62, "antiblocking" should read -- anti-blocking --;
Line 63, "antiblocking" should read -- anti-blocking --;

Column 15,
Line 21, before "Example 6" insert -- the results show linear increases in the value of peel strength with coating thickness over the thickness examined. --;

Column 20,
Line 59, "Grade 3B" should read -- Grade 3b --;

Column 21,
Line 62, "Regalrezm" should read -- Regalrez$^{TM}$ --;

Column 24,
Line 24, "Table 19" should read -- Table 20 --;
Line 26, "Table 20" should read -- Table 21 --;
Line 29, "TABLE 19" should read -- TABLE 20 --;
Line 46, "TABLE 20" should read -- TABLE 21 --;

UNITED STATES PATENT AND TRADEMARK OFFICE
CERTIFICATE OF CORRECTION

PATENT NO. : 5,888,335
DATED : March 30, 1999
INVENTOR(S) : James J. Kobe, Maurice E. Freeman, Bradley D. Zinke, and Shih-Lai Lu It is certified that error appears in the above-identified patent and that said Letters Patent is hereby corrected as shown below:

Column 25,
Line 10, "Table 21" should read -- Table 22 --;
Line 12, "TABLE 21" should read -- TABLE 22 --;

Column 26,
Line 12, "crosslinking" should read -- crosslinked --;
Line 20, "target." should read -- target surface. --;
Line 21, "m" should read -- in --;
Line 27, "0.06 kN/m" should read -- 0.061 kN/m --

Signed and Sealed this

Sixteenth Day of October, 2001

Attest:

NICHOLAS P. GODICI
Attesting Officer          Acting Director of the United States Patent and Trademark Office